United States Patent Office 3,682,783
Patented Aug. 8, 1972

3,682,783
METHOD FOR COULOMETRIC KARL FISCHER TITRATION
Harald Dahms, Ossining, N.Y., Gabor B. Levy, Westport, Conn., and David M. Seltzer, Little Neck, N.Y., assignors to Photovolt Corporation, New York, N.Y.
No Drawing. Filed Mar. 15, 1971, Ser. No. 124,534
Int. Cl. G01n 27/44
U.S. Cl. 204—1 T
4 Claims

ABSTRACT OF THE DISCLOSURE

An improved reagent composition for coulometric titration of water by the Karl Fischer reaction comprises iodine, pyridine, sulfur dioxide and an inert organic solvent, the sulfur dioxide being present in a concentration of about 25 to about 50 percent by weight, and conveniently in about a 30-fold molar excess over the iodine. The reagent composition provides rapid coulometric titrations with minimal cycling at the endpoint.

BACKGROUND OF THE INVENTION

Determination of the water content of various substances by titration with coulometrically generated Karl Fischer reagents is known. See Bizot, Bulletin de la Societe Chemique de France, 1967 (1), 151 (1967); Meyer and Boyd, Anal. Chem. 31, 215 (1959); and Swenson and Keyworth, Anal. Chem. 35, 863 (1963). In such titrations, a sample is mixed with an anhydrous reagent comprising sulfur dioxide, pyridine, an iodine source, usually iodine or potassium iodide, and an anhydrous solvent, usually methanol, formamide, methyl Cellosolve or mixtures thereof. Automatic titrators include a means for coulometric generation of iodine such as constant current source, a cathode and anode, and a timer or the like for measuring the current passed through the titration mixture. The iodine generated coulometrically during the titration reacts with water according to the Karl Fischer reaction, in two steps

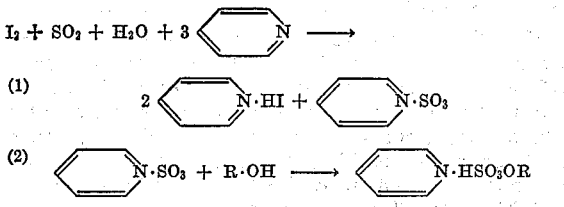

(wherein R represents the methyl moiety of methanol or the 2-methoxyethyl moiety of methyl Cellosolve). When a formamide solvent is employed, the second step above reacts with the pyridine-sulfur trioxide compound in a second reaction step

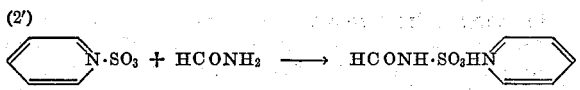

The endpoint of the titration is detected by a modified "dead-stop" technique. For example, a pair of detector electrodes is immersed in the solution and a potential difference of a few millivolts is maintained between them. While unreacted water is present in the titration vessel, polarization of the cathode prevents current flow between the sensing electrodes. At the end point further electrolytically generated iodine depolarizes the cathode, permitting current flow between the sensing electrodes. The resulting current flow can be used to indicate that the endpoint has been reached by deflection of a microammeter needle, or suitable relays may be employed to shut off current to the coulometric generator and timer. Alternatively, the endpoint is determined potentiometrically.

Near the endpoint of the titration when very little water is present, the rate at which iodine is consumed in the Karl Fischer reaction is generally slow in comparison to the rate at which iodine can be generated coulometrically. In a typical titration, the coulometer will generate enough iodine so that the endpoint detection electrodes detect a "false" endpoint. After the coulometer shuts off, the iodine is slowly consumed in the Karl Fischer reaction. The endpoint detection electrodes are again polarized, and the coulometer must generate more iodine. This cyclic titration procedure continues until the "true" endpoint is reached, at which time the current or potential changes at the detector electrodes remain at levels consistent with the absence of detectable water in the sample, i.e., changes at the detector electrodes are due to base line drift rather than untitrated water.

Excessive cycling at the end of such titrations increases the time required for titration, since each cycle can be several seconds in duration. Additionally, repeated cycling with its multiple interruptions of the coulometer current can introduce hysteresis errors into the results. It would thus be desirable to minimize cycling at the endpoint of coulometric titrations of water.

SUMMARY OF THE INVENTION

The present invention is directed to an improved reagent composition useful for coulometric titration of water, and is particularly directed to a reagent composition comprising an iodine source, pyridine, sulfur dioxide and an organic solvent. In the reagent composition of the invention the concentration of sulfur dioxide is much greater than in conventional Karl Fischer reagents, the sulfur dioxide being present in an amount of from about 25 to about 50 percent, and preferably from about 30 to about 40 percent by weight of the ultimate composition.

The reagent composition of the invention, when employed in coulometric titration of water, minimizes or eliminates the incidence of false or premature endpoints in titration. In many titrations, cycling is substantially eliminated, so that the coulometric titration proceeds continuously to the "true" endpoint.

The reagent composition can be employed in conventional coulometric water titration equipment and can be reused in coulometric water titrations for titration of water in numerous successive sample materials, which may be solids or liquids. The composition is also stable under the conditions of use for extended periods.

The reagent composition of the invention can be prepared according to conventional procedures for the preparation of Karl Fischer reagents, e.g., by dissolving the required amount of dry sulfur dioxide in pyridine and mixing this solution with a solution of iodine in pyridine and methanol. In general, the ingredients may be mixed in any convenient order or fashion to obtain a composition having the necessary amount of sulfur dioxide.

The iodine source can be added as molecular iodine or as an iodide salt such as potassium iodide, which is soluble in the composition and which does not interfere with the Karl Fischer reaction or as mixtures of molecular iodine and iodide ion. Prior to beginning the titration, the composition is adjusted to the endpoint, for example by addition of a slight excess of water and coulometric titration to the endpoint by known procedures. Since the iodine ingredient may be present both as molecular iodine and as iodide ion during use, the total available iodine concentration is hereinafter expressed as calculated on the basis of molecular iodine, $I_2$.

The organic solvent can be an anhydrous alcohol or alcohol ether of one to three carbon atoms, inclusive, formamide or other anhydrous Karl Fischer reagent solvent which reacts with the pyridine-sulfur trioxide complex under the conditions of the Karl Fischer reaction. Preferred organic Karl Fischer reagent solvents are methanol and mixtures of methanol with methyl Cellosolve (2-methoxyethanol).

The reagent composition of the invention contains from about 25 to about 50 percent by weight of sulfur dioxide and preferably contains from about forty to about fifty moles of sulfur dioxide per mole of iodine (as molecular iodine). The pyridine is employed in an amount sufficient to dissolve the sulfur dioxide (generally about 25 to 35 percent by weight). Preferably, from about 25 to about 40 moles of pyridine are employed per mole of iodine (as $I_2$). The amounts of pyridine and the iodine source relative to the solvent can vary considerably, provided that the composition contains sufficient of the Karl Fischer reagent solvent to satisfy the overall stoichiometry of the Karl Fischer reaction. In general, the composition contains from about 25 to about 50 percent by weight of solvent. A preferred composition contains from about one to about two to about three moles of methanol per mole of sulfur dioxide.

DESCRIPTION OF PREFERRED EMBODIMENTS

The titration reagent composition is preferably prepared in two components, a pyridine-$SO_2$ solution (A) and a conventional Karl Fischer reagent solution (B). 782.5 grams of dry sulfur dioxide are dissolved in 491 milliliters of dry pyridine to make a pyridine-$SO_2$ solution (A).

72 grams of iodine, 32.8 grams of dry sulfur dioxide and 187 milliliters of pyridine are dissolved in a mixture of 575 milliliters of anhydrous methanol and 345 milliliters of methyl Cellosolve to obtain a conventional Karl Fischer reagent solution (B).

80 milliliters of the above pyridine-$SO_2$ solution A are diluted to 200 milliliters with the above Karl Fischer reagent solution B and employed in an automatic coulometric water titrator (Aquatest®, Photovolt Corporation) using a coulometer which supplies current at 107.1 milliamperes (equivalent to 10 micrograms of water per second). Prior to beginning the titration, the composition is adjusted to the endpoint by the addition of a solution of water in methanol containing about 20 milligrams of water per milliliter of methanol to provide a slight excess of water over iodine in the reagent, followed by coulometric titration to the endpoint. In titrations of 1 milliliter samples of methanol containing about 1 milligram of water per milliliter, endpoints are reached with substantially no cycling. In contrast, titrations of similar samples using the above Karl Fischer reagent composition alone require 25 to 30 cycles to reach the endpoint, i.e., the coulometer current is interrupted 25 to 30 times by fluctuations in the potential at the sensing electrodes.

In another representative operation, a Karl Fischer reagent composition of the invention is prepared by mixing 75 milliliters of the above-described pyridine-sulfur dioxide solution A with 150 milliliters of the above-described conventional Karl Fischer solution B. The resulting reagent composition contains about 34.4 percent sulfur dioxide, 28.9 percent pyridine, 3.3 percent iodine, 19.3 percent methanol and 14.1 percent methyl Cellosolve, or about 46 moles of sulfur dioxide about 30.8 moles of pyridine and about 50 moles of methanol per mole of iodine (as $I_2$).

The above-described reagent composition is adjusted to the endpoint by addition of methanol/water and coulometric titration in an automatic titrator (Aquatest®, Photovolt Corporation) and employed in coulometric titrations using a constant electrolysis current of 107.1 milliamperes (equivalent to 10 micrograms of water per second) and detecting the endpoint potentiometrically. The reagent composition is found to give excellent results with an ordinary use with samples containing from about 500 to about 3000 micrograms of water. In most cases, endpoints are reached without cycling and the reagent composition can be reused in over one hundred titrations.

What is claimed is:

1. In a method of titrating water coulometrically by the Karl Fischer reaction, comprising adjusting a reagent composition comprising pyridine, sulfur dioxide, an iodine source and an organic solvent to a predetermined endpoint; mixing the adjusted composition with a sample to be titrated; and coulometrically generating iodine in the mixture by passing a constant current therethrough to titrate the sample; the improvement wherein:
    (a) the reagent composition contains from about 25 to about 40 percent by weight of sulfur dioxide, and further comprising the steps of:
    (b) continuing the coulometric generation of iodine by continuously passing the constant current through the mixture until the predetermined endpoint is first again reached in the mixture; and
    (c) determining the water content of the sample from the amount of electricity employed in the continuous coulometric generation of iodine when the endpoint is first again reached.

2. The method of claim 1 wherein the molar concentration of pyridine in the reagent composition is from about 25 to about 40 times the molar concentration of total available iodine.

3. The method of claim 1 wherein the organic solvent comprises methanol, and wherein the reagent composition contains from about one to about three moles of methanol per mole of sulfur dioxide.

4. The method of claim 1 wherein the concentration of sulfur dioxide in the reagent composition is from about 30 to about 40 percent by weight.

References Cited

UNITED STATES PATENTS 3,131,133    4/1964    Barendrecht _____ 204—195 T

OTHER REFERENCES

Bizot: "Bulletin de la Societe Chemique de France," 1967, No. 1, pp. 151–157.

Meyer et al.: "Anal. Chem.", vol. 31, 1959, pp. 215–219.

Swenson et al.: "Anal. Chem.", vol. 35, 1963, pp. 863–867.

TA-HSUNG TUNG, Primary Examiner

U.S. Cl. X.R.

252—408